(12) United States Patent
Ballard

(10) Patent No.: US 6,449,765 B1
(45) Date of Patent: Sep. 10, 2002

(54) VARYING WEB PAGE LINK BASED ON USER AND WEB PAGE STATUS

(75) Inventor: Clinton L. Ballard, Suquamish, WA (US)

(73) Assignee: Acceleration Software International Corporation, Poulsbo, WA (US)

( * ) Notice: Subject to any disclaimer, the term of this patent is extended or adjusted under 35 U.S.C. 154(b) by 0 days.

(21) Appl. No.: 09/370,546

(22) Filed: Aug. 9, 1999

(51) Int. Cl.$^7$ ................................................ G06F 9/455
(52) U.S. Cl. ........................ 717/174; 717/122; 717/168; 707/203
(58) Field of Search ................................ 717/1, 11, 168, 717/170, 174, 177; 707/513, 203, 511; 705/26

(56) References Cited

U.S. PATENT DOCUMENTS

| | | | |
|---|---|---|---|
| 5,835,712 A | * 11/1998 | DuFresne | 709/203 |
| 5,835,911 A | * 11/1998 | Nakagawa et al. | 707/203 |
| 5,867,714 A | * 2/1999 | Todd et al. | 717/172 |
| 5,911,145 A | * 6/1999 | Arora et al. | 707/514 |
| 5,974,429 A | * 10/1999 | Strub et al. | 707/203 |
| 6,035,119 A | * 3/2000 | Massena et al. | 717/1 |
| 6,049,664 A | * 4/2000 | Dale et al. | 717/1 |
| 6,073,214 A | * 6/2000 | Fawcett | 711/133 |
| 6,076,108 A | * 6/2000 | Courts et al. | 709/227 |
| 6,094,662 A | * 7/2000 | Hawes | 707/104 |
| 6,096,096 A | * 8/2000 | Murphy et al. | 717/11 |
| 6,209,036 B1 | * 3/2001 | Aldred et al. | 709/229 |
| 6,216,112 B1 | * 4/2001 | Fuller et al. | 705/14 |
| 6,300,947 B1 | * 10/2001 | Kanevsky | 345/333 |
| 6,314,565 B1 | * 11/2001 | Kenner et al. | 717/170 |
| 6,347,398 B1 | * 2/2002 | Parthesarathy et al. | 717/174 |

FOREIGN PATENT DOCUMENTS

WO WO 01/25927 A1 * 12/2001 ........... G06F/11/34

OTHER PUBLICATIONS

Larmour et al, "Integartion of information development with product development", ACM DOC, pp 94–100, Oct. 1995.*
Tauscher et al, "Revisitation patterns in world wide web navigation", ACM CHI, pp 399–406, 1997.*
Lake et al, :Logic programming with world wide web, ACM Hypertext, pp 235–245, 1996.*

* cited by examiner

Primary Examiner—Anil Khatri
(74) Attorney, Agent, or Firm—Steven P. Koda, Esq

(57) ABSTRACT

A plurality of vendors include a prescribed hyperlink protocol in their web pages to be participating web pages. The protocol included is the same for everyone, although the function and appearance of a resulting hyperlink varies. For a non-participating end user, the prescribed hyperlink forwards access to a sign-up site. For a participating end user, the function varies according whether the current web page is the referral web site start page, a referral web site non-start page, the privileged web site start page, a privileged web site non-start page, or another participating web page. For the referral start page, the hyperlink redirects access to the privileged web site start page. For the privileged start page, the hyperlink redirects access to the referral start page. For other participating web pages, the function may rotate to redirect access to the referral site or the privileged domain.

16 Claims, 8 Drawing Sheets

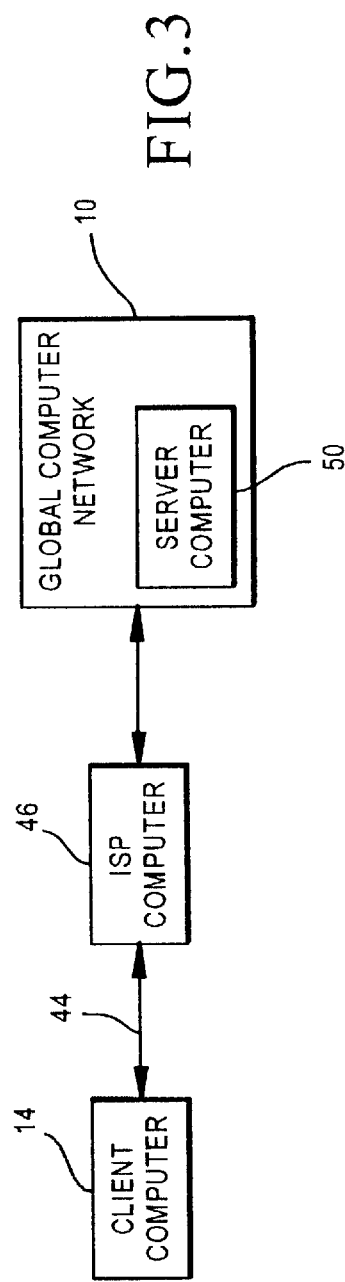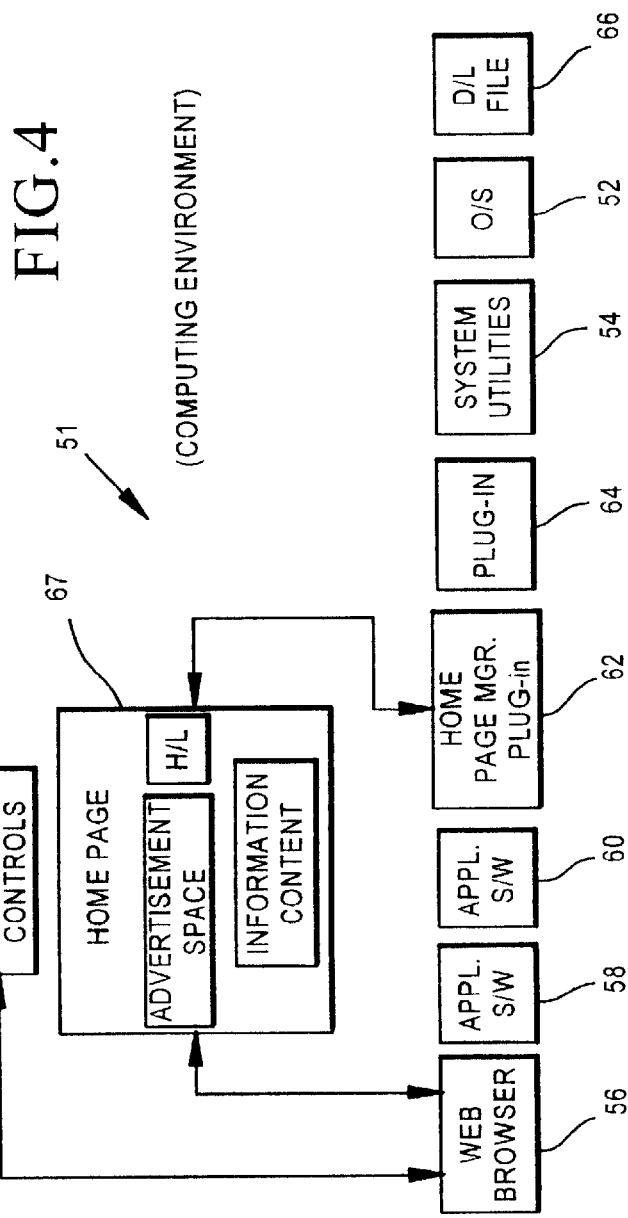

HTML FOR A PARTICIPATING WEB PAGE RESOURCE 74

VARYING WEB PAGE LINK BASED ON USER AND WEB PAGE STATUS

CROSS REFERENCE TO RELATED APPLICATIONS

This invention is related to U.S. patent application Ser. No. 09/354,951 filed Jul. 16, 1999 for Software Execution Contingent on Home Page Setting. The content of that application is incorporated herein by reference and made a part hereof.

BACKGROUND OF THE INVENTION

This invention relates to a system and method for linking web pages on a global computer network, and more particularly to a system and method for attracting end user access to specific web sites.

A global computer network is accessed by a wired or a wireless transfer medium. Currently, the largest global computer network is the internet. The formal definition of the "Internet" is the global information system that (i) is logically linked together by a globally unique address space based on the Internet Protocol (IP) or its subsequent extensions/follow-ons; (ii) is able to support communications using the Transmission Control Protocol/internet Protocol (TCP/IP) suite or its subsequent extensions/follow-ons, and/or other IP-compatible protocols; and (iii) provides, uses or makes accessible, either publicly or privately, high level services layered on the communications and related infrastructure. The term "Internet" is commonly used to refer to the physical structure, including client and server computers and the phone lines that connect everything into a global information system. The common categories of information services available overt internet include information retrieval services, information search services, communication services, and multimedia information services. The information retrieval services include FTP and Gopher. The information search services include WAIS, Archie, and Veronica,. The communication services include Email, Telnet, USENET, and IRC. The multimedia information services include the World Wide Web (WWW).

The WWW is an increasingly popular service of the internet. Documents accessed over the WWW are ASCII documents that contain commands from a language called HTML (hypertext markup language). HTML commands allow a programmer to tag passages of text. The tag is used by a web browser application at the client computer to format the text for display. Tagging allows effective text formatting (e.g., larger text for heading, bold or italic text for emphasis). HTML also allows in-line images to be included. Another feature of HTML is hypertext links. Hypertext links allow a client to load another WWW document by clicking a link area on the display screen. A document may contain links to many other related documents. The related documents may be on the same computer as the first document, or may be on a computer on the other side of the world. A link area typically includes a word, group of words, a graphic or a combination of words and graphics.

The internet, an example of a global computer network, is being used increasingly for accessing information and for communicating among individuals and businesses. As a venue for potential customers, it is desirable for vendors to attract end users to specific web sites where information about products or services may be obtained and orders may be accepted. An end user typically locates a previously unfamiliar web site using a search engine or by clicking on a hyperlink from another web site. It is known to include banner advertising at specific web sites to promote access to commercial sites and other general advertising functions. An alternative method for generating traffic to commercial and non-commercial sites is described below.

SUMMARY OF THE INVENTION

According to the invention, a plurality of vendors participate in a user traffic generating process by including a prescribed hyperlink protocol in web pages under each respective vendor's control. Each web page with the prescribed hyperlink is referred to herein as a participating web page.

An end user agrees to become part of this traffic generating process based on some commercial offer, such as free software. Alternatively, something else of value is offered to the end user. An end user becomes a participating end user by 'signing up' at a sign-up web site domain.

According to another aspect of this invention, one manner in which an end user gets to the sign-up web site domain is by clicking on the prescribed hyperlink from a participating web page. In such instance, the participating web page is referred to as a referral web page (with regard to the specific participating end user). The referral web page and the other participating web pages within the same domain are collectively referred to as the referral web site.

According to another aspect of this invention, in some embodiments there is a privileged web site which receives similar benefits as the referral web site.

According to another aspect of the invention, the function executed by the prescribed hyperlink protocol on each participating web page varies according to the end user status. For an end user which is not a participating end user, the prescribed hyperlink provides a function of forwarding access to the sign-up web site domain. In particular when a non-participating end user clicks on the prescribed hyperlink at a participating web page, the sign-up web site domain is accessed and displayed.

For an end user that is a participating end user, the function varies according to the status of the participating web page upon which the prescribed hyperlink is displayed. The status of the participating web page for a participating end user is any of: the referral start page, another participating web page within the same domain as the referral start page, the privileged domain start page, another web page within the privileged domain, or another participating web page.

According to another aspect of this invention, the appearance of the prescribed hyperlink also varies with the function performed by such hyperlink.

According to another aspect of this invention, the prescribed hyperlink on the referral start page in varying embodiments serves as a hyperlink to the sign-up web site domain, the privileged domain, a user's preferred page set by the end user, or another participating web page resource—where the specific resource varies.

According to another aspect of this invention, the prescribed hyperlink on other web pages within the referral web site in varying embodiments is a hyperlink to the privileged domain, or the user's preferred page. Preferably, the prescribed hyperlink when clicked serves to change the referral start page within the referral web site to the current web page. Thus, the participating end user is able to move the start page benefit from the original referral web page to any participating web page within the same domain as the original referral web page.

According to another aspect of this invention, the prescribed hyperlink on the privileged domain start page in varying embodiments is a hyperlink to the referral web site, the user's preferred page, or another participating web page resource—where the specific resource varies.

According to another aspect of this invention, the prescribed hyperlink on other web pages within the privileged domain in varying embodiments is a hyperlink to the referral web site, or a user's preferred page. Preferably the prescribed hyperlink when clicked serves to change the privileged domain start page to the current web page within the privileged domain. Thus, the participating end user is able to move the privileged domain start page within the privileged domain.

According to another aspect of the invention, the prescribed hyperlink on any other participating web page in varying embodiments serves as a hyperlink to the privileged domain, the referral web site domain, or another participating web page resource.

According to another aspect of this invention, the prescribed hyperlink protocol inserted into the HTML for each participating web page is the same. The function and appearance of the prescribed hyperlink varies according to the end user status and web page status as described above.

According to some embodiments, a participating end user also gives up control of their home page. As a result, the participating end user may have different web pages appear as the home page during different log-ons to the global computer network.

According to another aspect of this invention, the referral web page, or another participating web page within the referral web site, is weighted, or receives a fixed or variable percentage of the opportunities to be the home page for the corresponding participating end user.

According to another aspect of the invention, other participating web pages also may receive opportunities to be the home page based upon varying embodiments. For example, a given percentage of home page opportunities may be rotated randomly or according to a weighting scheme among participating web pages, or participating web pages which pay a fee for such added weighting.

According to another aspect of the invention, a privileged domain also may receive opportunities to be have a web page within such privileged domain be the home page. In some embodiments, for any given log-on the home page for a given participating end user is selected from the referral web site of such end user and the privileged web site only. In other embodiments the home page for any given log-on is selected from the referral web site, the privileged web site and other participating web pages. In still other embodiments the home page for any given log-on is selected from the referral web site and other participating web pages without distinguishing the privileged domain.

According to an advantage of this invention, vendors and others web site owners are able to share in being an occasional home page for specific end users. According to another advantage of the invention, an end user is able to control which web page within a given domain (e.g., referral web site; privileged domain) is to have a greater weight in being such end user's home page. These and other aspects and advantages of the invention will be better understood by reference to the following detailed description taken in conjunction with the accompanying drawings.

BRIEF DESCRIPTION OF THE DRAWINGS

FIG. 3 is a diagram of an end user computer linked to a server computer which is linked to the global computer network;

FIG. 4 is a block diagram of a global network computer computing environment;

DESCRIPTION OF SPECIFIC EMBODIMENTS

Host Network Environment

Figure 1:
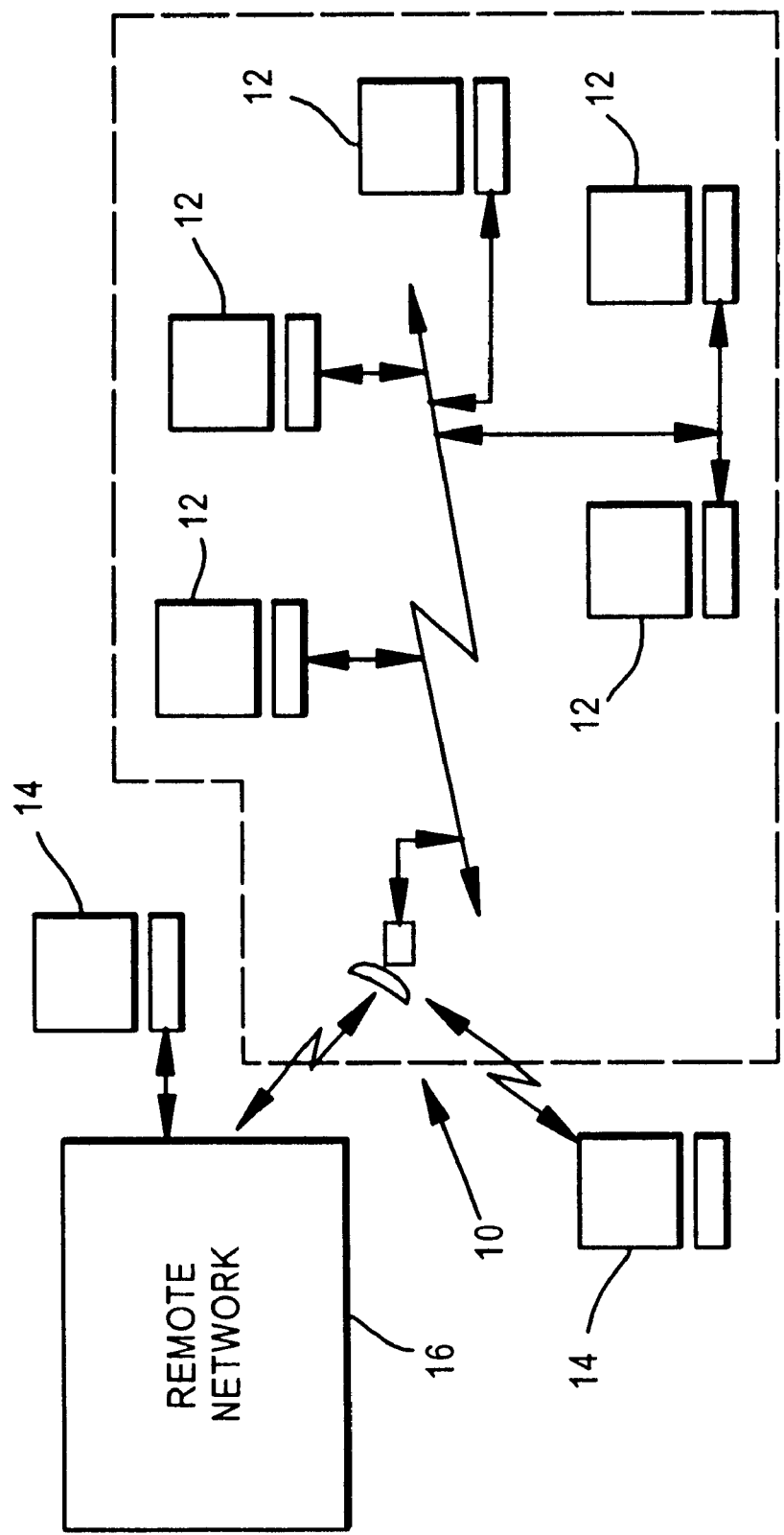
FIG. 1 is a schematic diagram of a global computer network.

FIG. 1 shows a global computer network 10 formed by a plurality of network server computers 12 which are interlinked. Each network server computer 12 stores files accessible to other network server computers 12 and to client computers 14 and networks 16 which link into the global computer network 10. The configuration of the network 10 may change over time as client computers 14 and one or more networks 16 connect and disconnect from the network 10. For example, when a client computer 14 and a network 16 are connected with the network servers computers 12, the global computer network includes such client computer 14 and network 16. As used herein the term computer includes any device or machine capable of accepting data, applying prescribed processes to the data, and supplying results of the processes.

The global computer network 10 stores information which is accessible to the network server computers 12, remote networks 16 and client computers 14. The information is accessible as files. The term file as used herein, includes files (as per the Windows operating system usage), documents (as per the MacOS operating system usage), pages (as per the world wide web phraseology usage), and other records, entries or terminology used to describe a unit of a data base, a unit of a file system or a unit of another data or information resource. Typically, there are text files, binary files, audio files, video files, multimedia files, and other types of data files and executable files stored on the global computer network.

A client computer 14 accesses the global computer network 10 by a wired or a wireless transfer medium. A user accesses the internet, for example, using a modem and the standard telephone communication network. Alternative carrier systems such as cable and satellite communication systems also are being contemplated for delivery of internet and wide area network services.

The network server computers 12 are formed by main frame computers minicomputers, and/or microcomputers having one or more processors each. The server computers 12 are linked together by wired and/or wireless transfer media, such as conductive wire, fiber optic cable, and/or microwave transmission media, satellite transmission media or other conductive, optic or electromagnetic wave transmission media. The client computers 14 access a network server computer 12 by a similar wired or a wireless transfer medium. For example, a client computer 14 may link into the global computer network 10 using a modem and the standard telephone communication network. Alternative carrier systems such as cable and satellite communication systems also may be used to link into the wide area network 10. Still other private or time-shared carrier systems may be used. In one embodiment the global computer network is embodied by the Internet and its World Wide Web (WWW).

The client computer 14 is any end user computer, and may also be a mainframe computer, minicomputer or microcomputer having one or more microprocessors. The remote network 16 may be a local area network, a network added into the global computer network through an independent service provider (ISP) for the internet, or another group of computers interconnected by wired or wireless transfer media having a configuration which is either fixed or changing over time. Client computers 14 may link into and access the global computer network 10 independently or through a remote network 16.

Computer System

Figure 2:
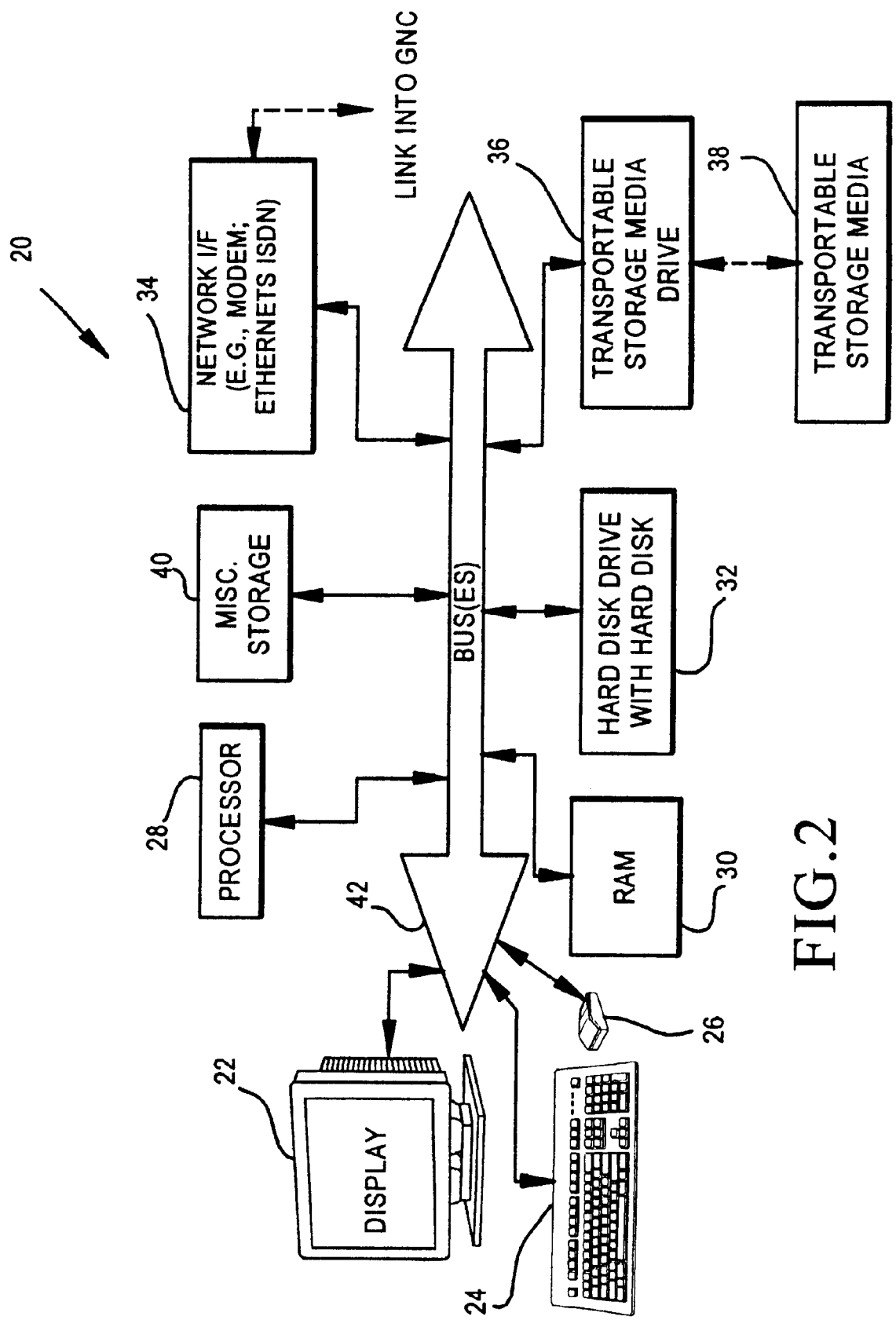
FIG. 2 is a block diagram of a computer system for a computer connected into the global computer network of FIG. 1.

The functions of the present invention preferably are performed by programmed digital computers of the type which are well known in the art, an example of which is shown in FIG. 2. A computer system 20 has a display 22, a key entry device 24, a pointing/clicking device 26, a processor 28, random access memory (RAM) 30, and a communication or network interface 34 (e.g., modem; ethernet adapter). In addition, there commonly is a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more busses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer 12, remote network 16 computer or a client computer 14. The computer system 20 may even be configured as a workstation, personal computer, network server, or a reduced feature network terminal device.

Accessing the WWW

Referring to FIG. 3, a client computer 14 accesses the global computer network 10 such as the Internet through a service provider computer 46 (such as an Internet Service Provider—'ISP'). In some embodiments, the client computer is directly linked into the network 10. When accessing the WWW portion of the global computer network 10, the client computer 14 accesses information using a uniform resource locator ('URL') address. Information from the URL is retrieved and displayed at the computer 14 display 22—such displayed information typically is referred to as a web page. Web browser software controls the communication of URL addresses and the formatting of retrieved information. An end user sets a preference accessible through the web browser software to define the URL for the first web page to be accessed and displayed upon logging onto the global computer network 10. Such first web page is referred to as the default home page. The user may changes the web browser preferences to change the default home page.

Once the user is logged onto the global computer network 10 and the home page is displayed, the user can browse other web pages. Typically, the home page has a set of hyperlinks which are preprogrammed with URL addresses for other information resources. In addition, there is a command line which allows a user to type in any URL. Typically the web browser tracks the various web pages visited in a session and allows the user to go back or forward within such list. Often the web browser allows the user to store a list of favorite web pages visited.

Another common way of browsing resources is to access a search engine at a server computer 50. Once the user accesses the web page which serves as a search engine, the user enters search criteria (e.g., keywords, URL). The search engine then retrieves a list of hyperlinks to web pages meeting the search criteria. There are several known search engines that search for WWW documents. These are accessed by URL identifier, and include, for example, Yahoo, Magellan, Lycos, Altavista, Looksmart, and YourPortal. There also are search engines that search for audio songs, such as the MP3 based search engines.

As the global computer network becomes more and more of a communication forum for the exchange of information and services, the desire to control the content of a user's home page becomes more valuable. In a sense the home page and other web pages are potentially valuable advertising spaces, similar to the advertising applicability of the television and the radio. It is already known to include banner advertisements across a portion of a web page. The banner advertisement typically changes rapidly and supplements the generally constant information content on the remainder of the web page.

Referring to FIG. 4, a computing environment 51 is displayed. The computing environment 51 is determined by the software programs executed by the client computer 14. Included are an operating system 52 (e.g., Apple's MacOS platform; any of Microsoft's DOS or Windows platforms; any of the permutations of the UNIX operating system; Linux or others). Also included are one or more system utilities 54 which control the operation of the computer 14 and the interaction with peripheral devices. In addition, there are one or more application programs 56–60 which greatly influence the working or playing environment for the user (e.g., games, word processors, spreadsheets, presentation graphics, accounting programs).

With the proliferation of the global computer network a common application program is a web browser program 56. The web browser (e.g., Netscape Navigator; Microsoft Internet Explorer; MOSAIC; or others) controls access to the global computer network 10. To supplement the functionality of the web browser 56 and allow more effective access to the global communication network's information resources, there typically are several additional software programs called by the web browser software 56. These programs are referred to as software plug-ins 64, because they are initiated by the web browser 56 or are initiated in relation to web browser operation or global computer network access. In addition, there may be one or more self-executing files 66 (e.g., JAVA programs or other programs or scripts) downloaded from the global computer network 10.

Method for Linking Web Pages

Resources on the world wide web portion of global computer network are accessed by a uniform resource locator address (URL). The URL address format includes a domain name and any extensions to that name. The complete URL identifies a specific resource, such as a web page or an executable program which is run upon access to such URL address. Typically there are one or more resources within a given domain. When the resource is a web page, the resource includes a hypertext markup language (HTML) listing. Specifically, information content is interspersed among HTML commands which determine how to format the information content to be displayed.

Figure 5:
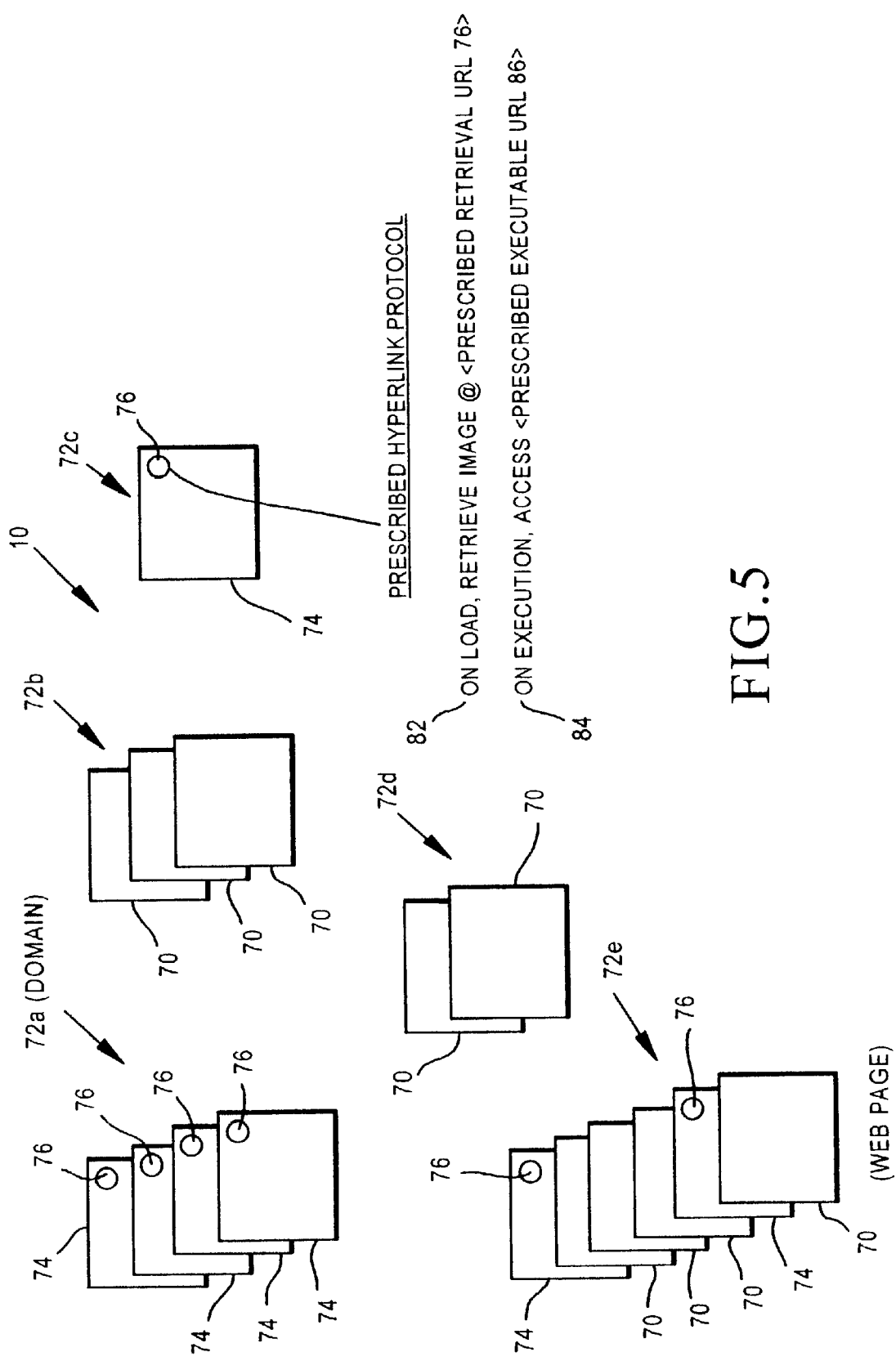
FIG. 5 is a diagram of domains and web page resources of a global computer network.

Of all the URL addresses (i.e., resources) on the global computer network 10, a subset of the addresses/resources are referred to herein as participating web page resources 74. Referring to FIG. 5, the WWW portion of the global computer network 10 is depicted as a plurality of web page resources 70, 74. The web pages are grouped together into differing domains 72 according to the URL address protocols for the WWW. Domains 72a–72e are shown. Each domain 72 includes one or more web page resources 70/74. None, any or all of the resources within a domain may be participating web page resources 74.

Figure 6:
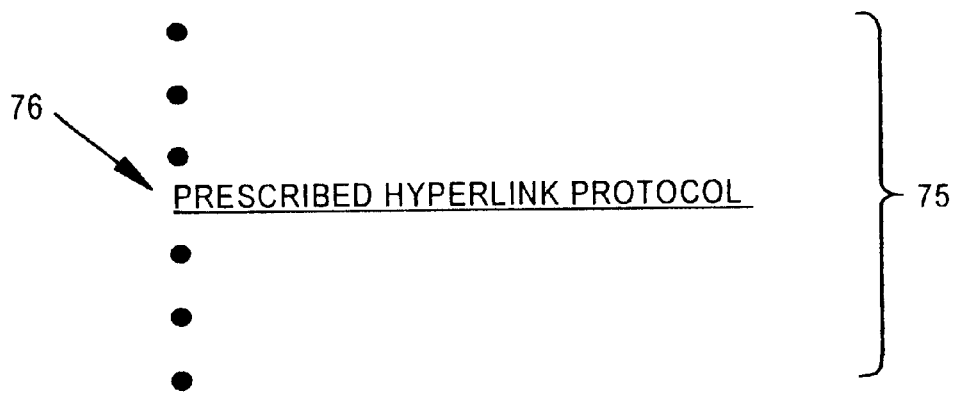
FIG. 6 is a listing format of a participating web page resource including a prescribed hyperlink protocol according to an embodiment of this invention.
Figure 7:
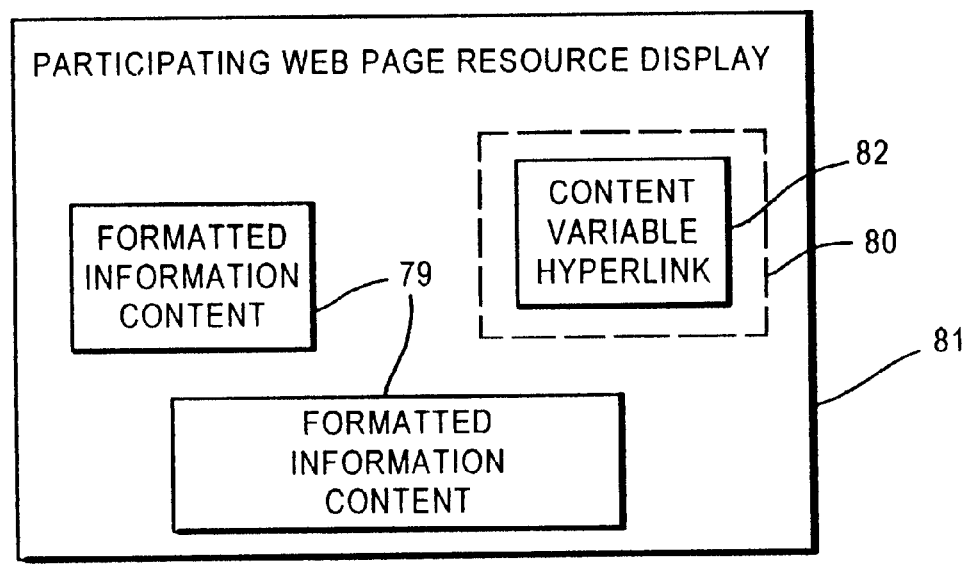
FIG. 7, is a display format of a participating web page resource including a content-variable hyperlink according to an embodiment of this invention.

A resource is considered to be a participating web page resource 74 when it includes a prescribed hyperlink protocol 76 among a listing 75 of HTML commands for formatting information content to be displayed (see FIG. 6). The prescribed hyperlink protocol 76 results in the appearance of a content-variable hyperlink 82 displayed with the information content 79 of the web page resource 74. FIG. 7 show shows a display 81 of an exemplary participating web page resource 74.

Every participating web page resource 74 includes the same prescribed hyperlink protocol 76. The prescribed hyperlink protocol includes a specific set of hypertext markup language commands. One command 82 (see FIG. 5) is to access a prescribed URL 78 to retrieve a label (e.g., graphic image, text) 80 to be displayed with the web page content 81 of the participating web page resource 74 from which the prescribed URL 78 is called. For purposes of clarity, this prescribed URL is referred to herein as a prescribed retrieval URL 78. Thus, every participating web page resource 74 will access the prescribed retrieval URL 78 to retrieve the label 80. The label 80 which is retrieved varies according to end user status and participating web page resource status.

Such label is displayed among the web page content 81 to identify the content variable hyperlink 82 to the end user. Another command included among the prescribed hyperlink protocol 76 is a command 84 to access another prescribed URL 86 upon activation of the content-variable hyperlink 82. The prescribed URL 86 is an executable resource. Specifically, when such URL is accessed a computer program is executed at the URL 86 site. For purposes of clarity, the URL 86 is referred to herein as a prescribed executable URL 86. In one embodiment a perl program is executed. The function performed upon execution of the perl program varies according to the status of the end user and the participating web page resource 74. Note that although the identical commands 82, 84 and parameters appear in the HTML listing 75 for every participating web page resource 74, the appearance and function of the resulting hyperlink 82 varies according to end user status and web page resource status.

In one embodiment the range of end user statuses include: participating end user and nonparticipating end user. However, other end user information may be used in differing embodiments to define varying end user statuses. Other bases for deriving status include, but are not limited to end user demographics, length of participation, registration for a particular software program, or ownership of a particular product.

In one embodiment, the range of participating web page resource statuses includes: identifying the web page resource as being any of a referral web site start page, a referral web site non-start page, a privileged domain start page, a privileged domain non-start page, or another participating web page resource. Note that the web page resource status is defined for a specific end user. By end user, as one skilled in the art will appreciate, it is meant an end user account for accessing the global computer network from a given end user computer 20. In some embodiments there are no statuses for a privileged domain start page or privileged domain non-start page. Again, other ways of classifying the participating web page resource relative to the end user may be used. Preferably there is only one participating web page resource which has the status of being a referral web site start page for a given end user. Similarly, it is preferred that there is only one privileged web page resource which has the status of being a privileged web site start page. Any other participating web page resource having the same domain root as the referral web site start page has the status of being a referral web site non-start page. Similarly, any other participating web page resource having the same domain root as the privileged web site start page has the status of being a privileged web site non-start page.

In one embodiment a participating web page resource is a privileged web page by paying a fee for the privilege. In another embodiment the privileged web site is a site of the vendor which controls the appearance and function of the content varying hyperlink 82. In some embodiments it is the same web site at the sign up web site or part of the same domain as the sign up web site. The criteria for being a privileged web site, however, may vary. Any criteria which distinguishes one web site from all others is satisfactory criteria for designating a privileged web site.

Operation

During end user access to the WWW, it is common to move among resources 70/74 using hyperlinks and displaying the corresponding web pages. For each participating web page, the content-variable hyperlink 82 will be displayed. Before an end user signs up to be a participating member, the end user is identified as a nonparticipating end user.

When the end user status identifies the end user as being a non-participating end user, the appearance and function of the content variable hyperlink 82 is the same on all participating web page resource 74 displays 81. In a preferred embodiment, the hyperlink 82 includes a label alerting the end user of the offer to become a participating end user. If the user activates the hyperlink 82, access is moved to a sign-up web site where something of value is offered to the end user in exchange for agreeing to become a participating end user. In various examples, the end user may be offered free software, free access time, money, another product or service, or anything else of potential benefit to an end user. In some embodiments nothing is offered. At a web page within the sign-up web site the end user interacts by accepting or rejecting to become a participating end user. Alternatively the end user also can simply redirect access to another web page resource without entering a selection. In the case where the end user signs up, such end user now has the status of being a participating end user.

Figure 8:
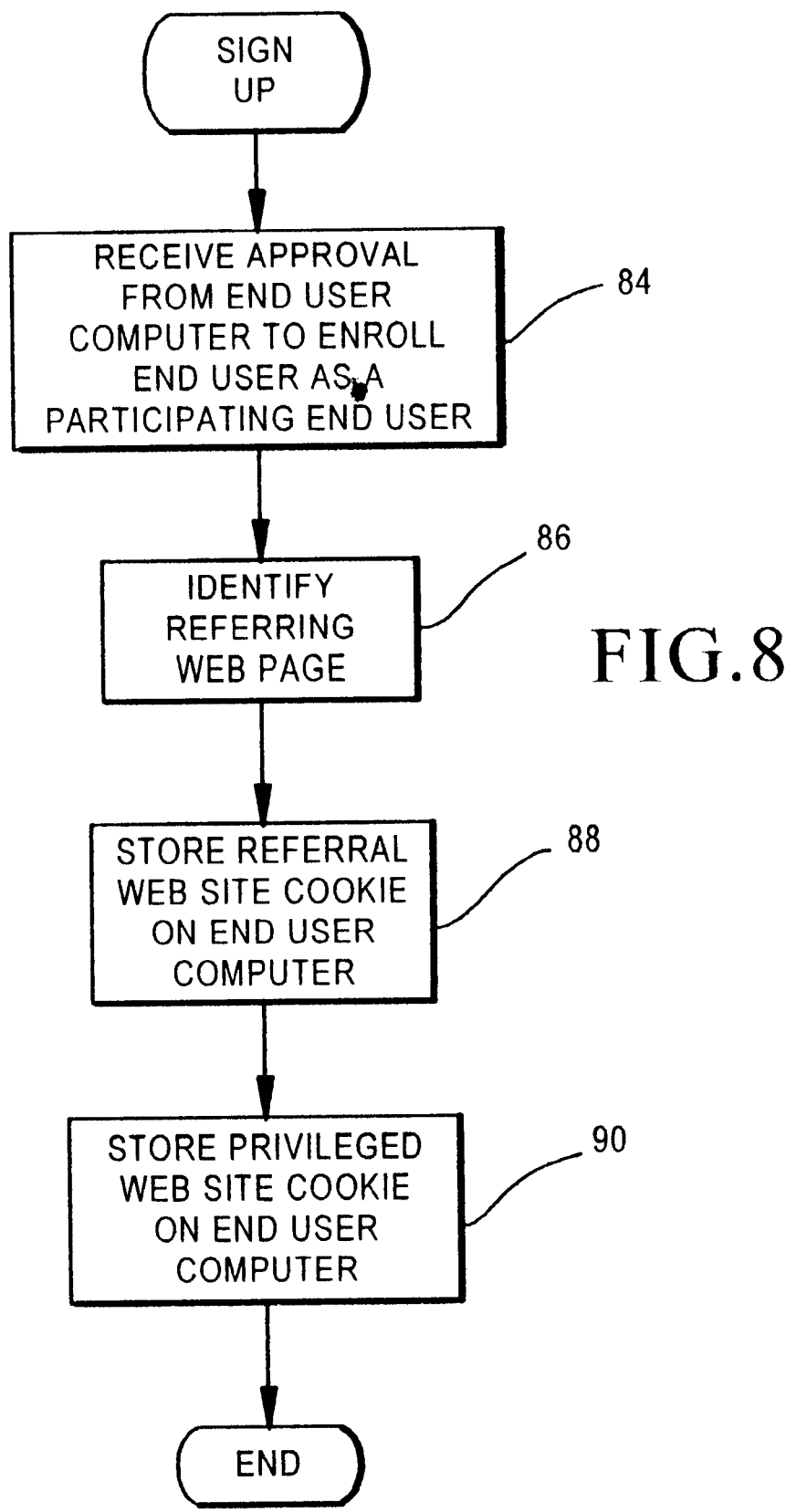
FIG. 8 is a flow chart of steps included in processing an end user's agreement to become a participating end user.

Referring to FIG. 8, at step 84 approval is received from the end user to become a participating end user. To get to the sign up web site, the end user clicked on the content variable hyperlink 82 from some participating web page resource 74

(referred to herein as a referral web site) display 81. At step 86 such specific web page resource 74 is identified to become the referral web site start page. At step 88 the URL address of such referral web site start page is stored in a 'cookie' which identifies such URL address as having the status of being the referral web site start page. Such 'cookie' is stored on the end user's computer. Any other participating web page resource 74 having the same domain root is considered to have a status of being a referral web site non-start page.

Another cookie also is formed and stored on the end user computer at step 90. Such other 'cookie' identifies a specific URL address as having the status of being the privileged web site start page. In one embodiment the privileged web site domain is the same for all participating end users. Any other participating web page resource 74 having the same domain root is considered to have a status of being a privileged web site non-start page.

Figure 9:
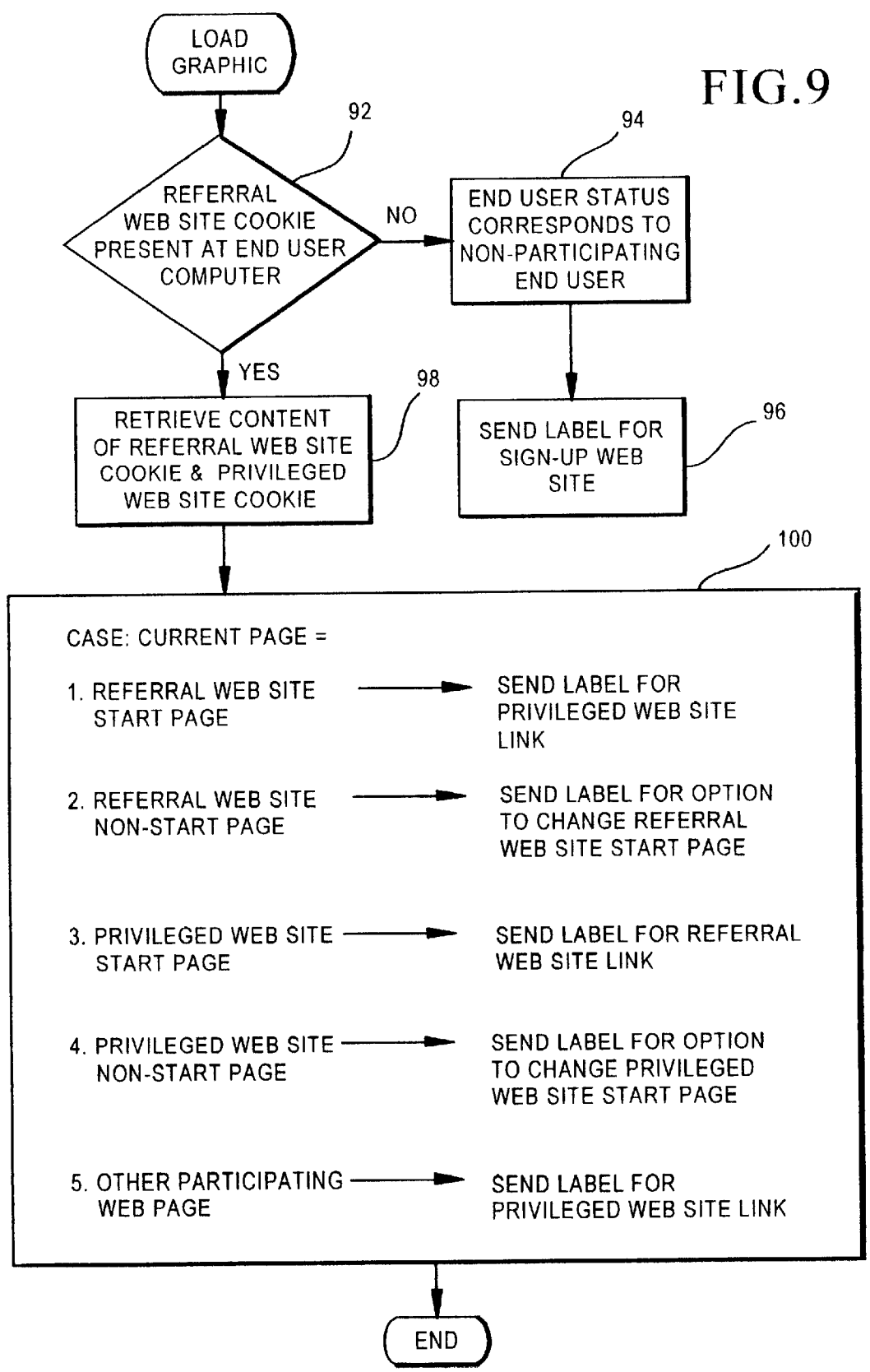
FIG. 9 is a flow chart for processing a first portion of the prescribed hyperlink protocol according to an embodiment of this invention.

Once the end user becomes a participating end user, the function of the content variable hyperlink 82 varies in some cases according to the status of the participating web page resource 74 accessed. Upon access to a participating web page resource 74 web page content is downloaded to the end user computer for display. During loading the label is retrieved to be displayed for the content-variable hyperlink 82. To do so, the prescribed retrieval URL 78 is accessed. An executable program runs in response to such access. In a preferred embodiment such executable program is located at a resource other than the end user computer. Referring to FIG. 9, at step 92, the executable program attempts to find the referral web page start page 'cookie' on the end user computer 20. If not present, it is assumed at step 94 that the end user is a nonparticipating end user. At step 96, the label to offer the end user to sign up and become a participating end user is loaded to the end user computer for display.

If the referral web site start page 'cookie' is found, then the content is retrieved at step 98. The URL address for the privileged domain start page (e.g., also stored on the end user computer 20), also is retrieved. At step 100, the URL address of the participating web page 74 for which content is being loaded (i.e., the currently loading web page) is compared to the referral web site domain and start page, and to the privileged web site domain and start page.

Case 1: The currently loading web page is determined to be the referral web site start page. The result in one embodiment is that a label is sent from the prescribed retrieval URL 78 to identify the privileged web site. In an alternative embodiment a label is sent for a participating web page resource. For example, the executable program at URL address 78 running during the load cycle may rotate the function of the hyperlink 82 to allow access to a varying participating web page resource at varying times. Such rotation is random in some embodiments. In other embodiments the rotation is weighted to give the privileged web site higher priority, and/or to give participating web sites that pay a special fee or some other compensation added priority.

The specific label which corresponds to a specific participating web page resource is maintained by the vendor/owner/controller of the specific participating web page resource. The label (e.g., graphic) is stored at a known location within the domain of the specific participating web page resource.

In still another embodiment, the label for a hyperlink to a end user's preferred page is sent. For example, the end user during signing up may give up control of their home page. Their prior home page is stored in another cookie on the end user computer, and serves the function of being an alternative home page. A hyperlink to such alternative home page is provided at the referral web site start page as the content varying hyperlink 82. The end user's preferred page in other implementations need not be the alternative home page, but may be selected or changed by the end user to be any of the participating web page resource 74—or even any web page resource 70. In one embodiment the label is the same for all end users (e.g., a label such as "Alternative Home Page").

Note that in some embodiments the result of case 1 is fixed to be the same for each access. In some embodiments, however, the label may vary from one access to another. For such embodiments, a 'cookie' is stored on the end user computer which identifies the URL address corresponding to the label sent. Such 'cookie' is overwritten each time a participating web page resource is loaded.

Case 2: The currently loading web page is determined to be a referral web site non-start page. In a preferred embodiment a label is sent to the end user computer for display as the label of the content-variable hyperlink 82 to communicate the concept of the end user having an option to change the referral web site start page to the current web page being displayed. The specific label may vary and in one embodiment displays a message such as "Start here." In an alternative embodiment, the label is the same as for case 1, and correspondingly, the function is the same as the function for the case 1 status.

Case 3: The currently loading web page is determined to be the privileged web site start page. In one embodiment a label is sent which identifies the referral web site. In an alternative embodiment a label is sent for a participating web page resource. For example, the executable program at URL address 78 running during the load cycle may rotate the function of the hyperlink 82 to allow access to a varying participating web page resource at varying times. Such rotation is random in some embodiments. In other embodiments the rotation is weighted to give the referral web site higher priority, and/or to give participating web sites that pay a special fee or some other compensation added priority. In still another embodiment, the label for a hyperlink to the end user's preferred page is sent, as described above for case 1.

Note that in some embodiments the result of case 3 is fixed to be the same for each access. In some embodiments, however, the label may vary from one access to another. For such embodiments, a 'cookie' is stored on the end user computer which identifies the URL address corresponding to the label sent. Such 'cookie' is the same for all cases and is overwritten each time a participating web page resource is loaded.

Case 4: The currently loading web page is determined to be a privileged web site non-start page. In a preferred embodiment a label is sent to the end user computer for display as the label to the content-variable hyperlink 82 to communicate the concept of the end user having an option to change the privileged web site start page to the current web page being displayed. In an alternative embodiment the label is the same as for case 3, the function is the same as the function for the case 3 status.

Case 5: The currently loading web page is a participating web page resource which is not part of the referral web site domain or the privileged web site domain. In one embodiment a label is sent which identifies the privileged web site. In another embodiment a label is sent which identifies the referral web site. In still another embodiment the label which is sent varies. A portion of requests for a label are serviced by sending a label which identifies the privileged web site, while another portion of requests are serviced by sending a label which identifies the referral web site.

In an alternative embodiment a label is sent for another participating web page resource. For example, the executable program at URL address 78 running during the load cycle may rotate the function of the hyperlink 82 to allow access to a varying participating web page resource at varying times. Such rotation is random in some embodiments. In other embodiments the rotation is weighted to give the referral web and/or the privileged web site higher priority, and/or to give participating web sites that pay a special fee or some other compensation added priority.

Note that in some embodiments the result of case 5 is fixed to be the same for each access. In some embodiments, however, the label may vary from one access to another. For such embodiments, a 'cookie' is stored on the end user computer which identifies the URL address corresponding to the label sent. Such 'cookie' is overwritten each time a participating web page resource is loaded. This is the same 'cookie' as formed and overwritten for cases 1 and 3. For purposes of clarity, this cookie is referred to herein as the label identification cookie.

With the label sent to the end user computer, consider the example where the current page has been loaded and the content-variable hyperlink 82 is displayed among the other information content 79 of the display 81 (see FIG. 7). The end user will view the display 81, access another web page resource or quit. Consider the case where the end user clicks on the content-variable hyperlink 82 to activate such hyperlink. Any of several different labels appeared on such hyperlink 82 according to the case analysis performed at step 100 during the loading of the web page. In some embodiments, the cases at step 100 resulted in a known consistent fixed result for a given case. In such embodiments, the same logic is applied to identify the appropriate function to perform. In other embodiments, the cases can result in a varying response. In such embodiments the appropriate function to perform is determined by accessing the label identification 'cookie' on the end user computer.

Figure 10:
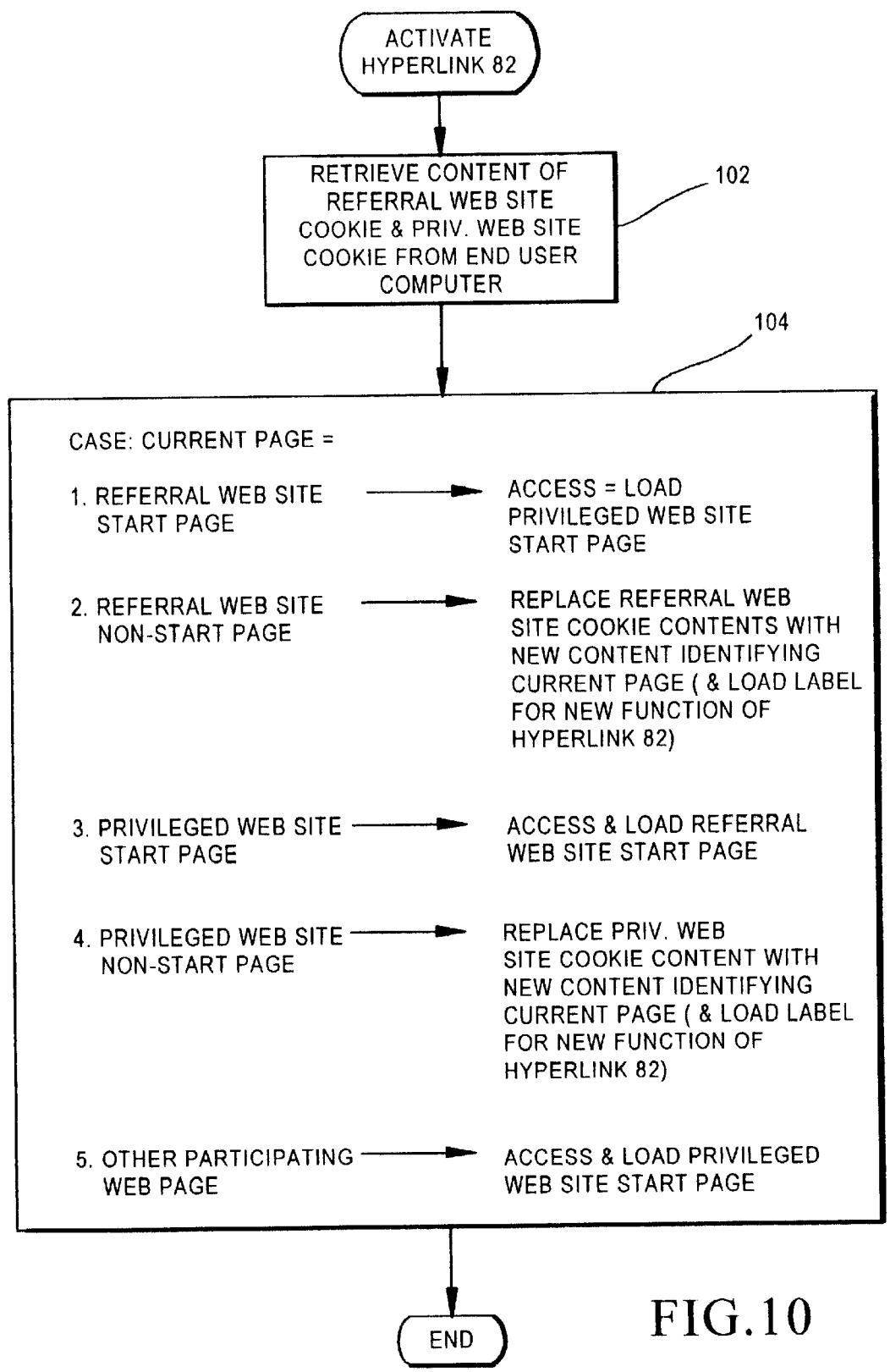
FIG. 10 is a flow chart for processing activation of the content-variable hyperlink according to an embodiment of this invention.

Referring to FIG. 10, at step 102 the appropriate 'cookies' are read from the end user computer. In the embodiments where cases at step 100 (see FIG. 9) resulted in a known consistent fixed result for a given case, the referral web site start page cookie and privileged web site start page cookie are retrieved. In the alternative embodiments where cases 1, 3 and/or 5 at step 100 may produce varying results for different accesses by the same end user, the label identification cookie is retrieved. Based on the information in the retrieved cookies, the executable perl program running in response to the access to URL address 86 is able to identify the function to give to the hyperlink 82. At step 104, a case determination is performed to identify the appropriate function.

Case 1: The currently loading web page is determined to be the referral web site start page. Three alternative embodiments were described above with regard to case 100. Two embodiments produced fixed results. One embodiment produced varying results. For the fixed result embodiments, the prescribed executable URL 86 redirects the access request to the privileged web site start page or the end user's preferred page, respectively. The information content for such web page is displayed at the end user computer. For the varying result embodiments, the participating web page resource URL address is read from the label identification cookie. Such URL address is accessed and its content displayed.

Case 2: A participating end user has a referral web site non-start page currently displayed. In the preferred embodiment the hyperlink 82 includes a label signifying an option to make the current page the start page for the referral web site. When the end user clicks on the hyperlink, the prescribed executable URL 86 changes the content of the referral web site start page cookie to identify the current web page resource. As a result, the current web page (which is in the same domain as the original referral web site start page) becomes the referral web site start page. In addition, a label is sent to the end user computer to replace the label for the hyperlink 82. In particular a label is sent according to the logic of case 1 of case step 100 (see FIG. 9 and the description of various embodiments for such case). In an alternative embodiment where the label is determined in the same manner as case 1 of step 100, the hyperlink 82 functions the same as for case 1 of step 104.

Case 3: The currently loading web page is determined to be the privileged web site start page. Three alternative embodiments were described above with regard to case 3 of step 100. Two embodiments produced fixed results. One embodiment produced varying results. For the fixed result embodiments, the prescribed executable URL 86 redirects the access request to the referral web site start page or the end user's preferred page, respectively according to the embodiment. The information content for such web page is displayed at the end user computer. For the varying result embodiments, the participating web page resource URL address is read from the label identification cookie. Such URL address is accessed and its content displayed.

Case 4: A participating end user has a privileged web site non-start page currently displayed. In the preferred embodiment the hyperlink 82 includes a label signifying an option to make the current page the start page for the privileged web site. When the end user clicks on the hyperlink, the prescribed executable URL 86 changes the content of the privileged web site start page cookie to identify the current web page resource. As a result, the current web page (which is in the same domain as the original referral web site start page) becomes the privileged web site start page. In addition, a label is sent to the end user computer to replace the label for the hyperlink 82. In particular a label is sent according to the logic of case 3 of case step 100 (see FIG. 9 and the description of various embodiments for such case). In an alternative embodiment where the label is determined in the same manner as case 3 of step 100, the hyperlink 82 functions the same as for case 3 of step 104.

Case 5: The currently loading web page is determined to be a participating web page resource not in the domain of the referral web site or the privileged web site. Four alternative embodiments were described above with regard to case 5 of step 100. Two embodiments produced fixed results. Two embodiment produced varying results. For the fixed result embodiments, the prescribed executable URL 86 redirects the access request to the privileged web site start page or the referral web site start page, respectively according to the embodiment. The information content for such accessed web page is displayed at the end user computer. For the varying result embodiments, the participating web page resource URL address is read from the label identification cookie. Such URL address is accessed and its content displayed.

Home Page Management

In some embodiments a participating end user gives up control of their home page setting. In other embodiments, hoe page management need not be included. When included, a home page manager program 62 is downloaded onto the end user computer during the sign up process. This program 62 monitors the client computer 14 home page 67 and in some embodiments controls the selection of the client computer home page. Specifically, the home page preference setting of the user's web browser 56 is set to a predetermined URL.

In one embodiment the predetermined URL executes as a common gateway interface (cgi) program. A URL which is a cgi invokes a program at the accessed network server, rather than invoking a static HTML web page. The cgi program redirects the user's browser to another web page which is to be the predetermined home page for the current session. The cgi program accesses a control site on the network 10 to find a URL address which is to be the predetermined home page for the client computer. The control site may be located on the same server as the cgi program or at another server. The control site may be accessed as a separate URL or may be a data area for access by the cgi program. For example, the control site may be a data area for use by the cgi program or it may be a URL accessed by the cgi program to get a home page URL for the user's current session. In one embodiment the control site rotates the home page during different log-ons to the global computer network to be either the privileged web site start page or the referral web site start page. In other embodiments the control site rotates the home page during different log-ons to the global computer network to be any of the participating web page resources 74. In particular the selection of the participating web page resource is rotated, either randomly or according to some weighted scheme. For example, the privileged web site and or the referral web site receive higher priority and thus more opportunities to be the home page. In some embodiments any participating web page resource can have an added weighting by paying a fee or some other form of compensation or benefit.

Meritorious and Advantageous Effects

According to an advantage of this invention, vendors and others web site owners are able to share in being an occasional home page for specific end users. According to another advantage of the invention, an end user is able to control which web page within a given domain (e.g., referral web site; privileged domain) is to have a greater weight in being such end user's home page or start page.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for linking an end user computer to access web page resources on a global computer network, the method comprising the steps of:

loading and displaying at an end user computer web page content from a first web page resource, the first web page resource being one of a plurality of participating web page resources, each one of the plurality of participating web page resources including a common prescribed hyperlink protocol among a set of hypertext markup language commands, the common prescribed hyperlink protocol including a first command to access a first prescribed resource address on the global computer network and a second command to access a second prescribed resource address on the global computer network;

executing said first command during said loading, whereupon said first prescribed resource address is accessed, a first executable resource being executed in response to said access of said first prescribed resource address, the first executable resource during execution identifying a status of the end user and a status of the first web page resource and returning to the end user computer a label selected based upon the identified end user status and the identified first web page resource status, said label being displayed at the end user computer as a first hyperlink among the loaded web page content; and in response to activation of the first hyperlink by the end user, executing said second command, whereupon said second prescribed resource address is accessed, a second executable resource located at the second prescribed resource address being executed in response to the access of the second prescribed resource address to determine a function of the first hyperlink, wherein the determined function is based upon the end user status and the first web page resource status;

wherein the end user status is any status among a range of end user statuses comprising a first end user status identifying the end user as being a participating end user and a second end user status identifying the end user as being a non-participating end user;

wherein the first web page resource status identifies the first web page resource as being one of a referral web site start page, a referral web site non-start page, a privileged web site start page, a privileged web site non-start page, and a non-referral web site, non-privileged web site, participating web page, wherein for a given end user there is only one referral web site start page and at least one referral web site non-start page, wherein said one referral web site start page and at least one referral web site non-start page are part of a common domain, wherein said one privileged web site start page and at least one privileged web site non-start page are part of a common domain, wherein there are a plurality of non-referral web site, non-privileged web site, participating web pages, wherein when the end user status is the first status and the first web page resource status identifies the first web page resource as the referral web site start page, the function of the first hyperlink is to link the end user computer to the privileged web site start page.

2. The method of claim 1, in which a browser software program is executed at the end user computer to enable access to the global computer network at an alterable home page, the alterable home page being set to a first URL address, the method further comprising the steps of:

changing the alterable home page to a predetermined URL address.

3. The method of claim 2, wherein the predetermined URL is an address for a self-executing program which executes upon access to the predetermined URL, and further comprising the steps of:

accessing the predetermined URL causing the self-executing program to execute;

identifying another URL address corresponding to one of the participating web page resources; and loading and displaying web page content at the end user computer from said identified another URL address.

4. The method of claim 3, wherein said range of statuses for the first web page resource status further comprises privileged web site start page and privileged web site non-start page, wherein the step of identifying said another URL address, comprises:

selecting a participating web page resource having a status of either one of referring web site start page or privileged web site start page.

5. The method of claim 3, wherein the step of identifying said another URL address, comprises: weighting the participating web page resource having a status of referring web site start page to be identified as said another URL address at least 25% of log-on accesses to the global computer network from the end user computer.

6. A method for linking an end user computer to access web page resources on a global computer network, the method comprising the steps of:

loading and displaying at an end user computer web page content from a first web page resource, the first web page resource being one of a plurality of participating web page resources, each one of the plurality of participating web page resources including a common prescribed hyperlink protocol among a set of hypertext markup language commands, the common prescribed hyperlink protocol including a first command to access a first prescribed resource address on the global computer network and a second command to access a second prescribed resource address on the global computer network;

executing said first command during said loading, whereupon said first prescribed resource address is accessed, a first executable resource being executed in response to said access of said first prescribed resource address, the first executable resource during execution identifying a status of the end user and a status of the first web page resource and returning to the end user computer a label selected based upon the identified end user status and the identified first web page resource status, said label being displayed at the end user computer as a first hyperlink among the loaded web page content; and in response to activation of the first hyperlink by the end user, executing said second command, whereupon said second prescribed resource address is accessed, a second executable resource located at the second prescribed resource address being executed in response to the access of the second prescribed resource address to determine a function of the first hyperlink, wherein the determined function is based upon the end user status and the first web page resource status;

wherein the end user status is any status among a range of end user statuses comprising a first end user status identifying the end user as being a participating end user and a second end user status identifying the end user as being a non-participating end user;

wherein the first web page resource status identifies the first web page resource as being one of a referral web site start page, a referral web site non-start page, a privileged web site start page, a privileged web site non-start page, and a non-referral web site, non-privileged web site, participating web page, wherein for a given end user there is only one referral web site start page and at least one referral web site non-start page, wherein said one referral web site start page and at least one referral web site non-start page are part of a common domain, wherein said one privileged web site start page and at least one privileged web site non-start page are part of a common domain, wherein there are a plurality of non-referral web site, non-privileged web site, participating web pages, wherein when the end user status is the first status and the first web page resource status identifies the first web page resource as the privileged web site start page, the function of the first hyperlink is to link the end user computer to an end-user preferred web page resource.

7. A method for linking an end user computer to access web page resources on a global computer network, the method comprising the steps of:

loading and displaying at an end user computer web page content from a first web page resource, the first web page resource being one of a plurality of participating web page resources, each one of the plurality of participating web page resources including a common prescribed hyperlink protocol among a set of hypertext markup language commands, the common prescribed hyperlink protocol including a first command to access a first prescribed resource address on the global computer network and a second command to access a second prescribed resource address on the global computer network;

executing said first command during said loading, whereupon said first prescribed resource address is accessed, a first executable resource being executed in response to said access of said first prescribed resource address, the first executable resource during execution identifying a status of the end user and a status of the first web page resource and returning to the end user computer a label selected based upon the identified end user status and the identified first web page resource status, said label being displayed at the end user computer as a first hyperlink among the loaded web page content; and in response to activation of the first hyperlink by the end user, executing said second command, whereupon said second prescribed resource address is accessed, a second executable resource located at the second prescribed resource address being executed in response to the access of the second prescribed resource address to determine a function of the first hyperlink, wherein the determined function is based upon the end user status and the first web page resource status;

wherein the end user status is any status among a range of end user statuses comprising a first end user status identifying the end user as being a participating end user and a second end user status identifying the end user as being a non-participating end user;

wherein the first web page resource status identifies the first web page resource as being one of a referral web site start page, a referral web site non-start page, a privileged web site start page, a privileged web site non-start page, and a non-referral web site, non-privileged web site, participating web page, wherein for a given end user there is only one referral web site start page and at least one referral web site non-start page, wherein said one referral web site start page and at least one referral web site non-start page are part of a common domain, wherein said one privileged web site start page and at least one privileged web site non-start page are part of a common domain, wherein there are a plurality of non-referral web site, non-privileged web site, participating web pages, wherein when the end user status is the first status and the first web page resource status identifies the first web page resource as the privileged web site start page, the function of the first hyperlink is to link the end user computer to the referral web site start page for the end user.

8. A method for linking an end user computer to access web page resources on a global computer network, the method comprising the steps of:

loading and displaying at an end user computer web page content from a first web page resource, the first web page resource being one of a plurality of participating web page resources, each one of the plurality of participating web page resources including a common prescribed hyperlink protocol among a set of hypertext markup language commands, the common prescribed hyperlink protocol including a first command to access a first prescribed resource address on the global computer network and a second command to access a second prescribed resource address on the global computer network;

executing said first command during said loading, whereupon said first prescribed resource address is accessed, a first executable resource being executed in response to said access of said first prescribed resource address, the first executable resource during execution identifying a status of the end user and a status of the first web page resource and returning to the end user computer a label selected based upon the identified end user status and the identified first web page resource status, said label being displayed at the end user computer as a first hyperlink among the loaded web page content; and in response to activation of the first hyperlink by the end user, executing said second command, whereupon said second prescribed resource address is accessed, a second executable resource located at the second prescribed resource address being executed in response to the access of the second prescribed resource address to determine a function of the first hyperlink, wherein the determined function is based upon the end user status and the first web page resource status;

wherein the end user status is any status among a range of end user statuses comprising a first end user status identifying the end user as being a participating end user and a second end user status identifying the end user as being a non-participating end user;

wherein the first web page resource status identifies the first web page resource as being one of a referral web site start page, a referral web site non-start page, one a privileged web site start page, a privileged web site non-start page, and a nonreferral web site, non-privileged web site, participating web page, wherein for a given end user there is only one referral web site start page and at least one referral web site non-start page, wherein said one referral web site start page and at least one referral web site non-start page are part of a common domain, wherein said one privileged web site start page and at least one privileged web site non-start page are part of a common domain, wherein there are a plurality of non-referral web site, non-privileged web site, participating web pages, wherein when the end user status is the first status and the first web page resource status identifies the first web page resource as one of the privileged web site non-start pages, the function of the first hyperlink is to change the privileged web site start page to the first web page resource.

9. A system for linking an end user computer to access web page resources on a global computer network, the system comprising:

means for loading and displaying at an end user computer, web page content from a first web page resource, the first web page resource being one of a plurality of participating web page resources, each one of the plurality of participating web page resources including a common prescribed hyperlink protocol among a set of hypertext markup language commands, the common prescribed hyperlink protocol including a first command to access a first prescribed resource address on the global computer network and a second command to access a second prescribed resource address on the global computer network;

means for executing said first command during said loading, whereupon said first prescribed resource address is accessed, a first executable resource being executed in response to said access of said first prescribed resource address, the first executable resource during execution identifying a status of the end user and a status of the first web page resource and returning to the end user computer a label selected based upon the identified end user status and the identified first web page resource status, said label being displayed at the end user computer as a first hyperlink among the loaded web page content; and means for executing said second command in response to activation of the first hyperlink by the end user, whereupon said second prescribed resource address is accessed, a second executable resource located at the second prescribed resource address being executed in response to the access of the second prescribed resource address to determine a function of the first hyperlink, wherein the determ ined function is based upon the end user status and the first web page resource status;

wherein the end user status is any status among a range of end user statuses comprising a first end user status identifying the end user as being a participating end user and a second end user status identifying the end user as being a non-participating end user;

wherein the first web page resource status identifies the first web page resource as being one of a referral web site start page, a referral web site non-start page, a privileged web site start page, a privileged web site non-start page, and a non-referral web site, non-privileged web site, participating web page, wherein for a given end user there is only one referral web site start page and at least one referral web site non-start page, and wherein said one referral web site start page and at least one referral web site non-start page are part of a common domain, and wherein there are a plurality of non-referral web site participating web pages;

wherein said one privileged web site start page and at least one privileged web site non-start page are part of a common domain, wherein there are a plurality of non-referral web site, non-privileged web site, participating web pages, wherein when the end user status is the first status and the first web page resource status identifies the first web page resource as the referral web site start page, the function of the first hyperlink is to link the end user computer to the privileged web site start page;

wherein when the end user status is the second end user status, the function of the first hyperlink is to link the end user computer to a prescribed web page resource, and further comprising:

means for loading and displaying web page content from the prescribed web page resource;

means for sending agreement from the end user to become a participating end user; and means for receiving data at the end user computer which identifies the first web page resource to have be the referral web site start page.

10. The system of claim 9, in which a browser software program is executed at the end user computer to enable access to the global computer network at an alterable home page, the alterable home page being set to a first URL address, the system further comprising:

means for changing the alterable home page to a predetermined URL address.

11. The system of claim 10, wherein the predetermined URL is an address for a self-executing program which executes upon access to the predetermined URL, and further comprising:

means for accessing the predetermined URL causing the self-executing program to execute;

means for identifying another URL address corresponding to one of the participating web page resources; and means for loading and displaying web page content at the end user computer from said identified another URL address.

12. The method of claim 11, wherein said range of statuses for the first web page resource status further comprises privileged web site start page and privileged web site non-start page, wherein the means for identifying said another URL address, comprises:

means for selecting a participating web page resource having a status of either one of referring web site start page or privileged web site start page.

13. The system of claim 11, wherein the mean for identifying said another URL address, comprises: weighting the participating web page resource having a status of referring web site start page to be identified as said another URL address at least 25% of log-on accesses to the global computer network from the end user computer.

14. A system for linking an end user computer to access web page resources on a global computer network, the system comprising:

means for loading and displaying at an end user computer, web page content from a first web page resource, the first web page resource being one of a plurality of participating web page resources, each one of the plurality of participating web page resources including a common prescribed hyperlink protocol among a set of hypertext markup language commands, the common prescribed hyperlink protocol including a first command to access a first prescribed resource address on the global computer network and a second command to access a second prescribed resource address on the global computer network;

means for executing said first command during said loading, whereupon said first prescribed resource address is accessed, a first executable resource being executed in response to said access of said first prescribed resource address, the first executable resource during execution identifying a status of the end user and a status of the first web page resource and returning to the end user computer a label selected based upon the identified end user status and the identified first web page resource status, said label being displayed at the end user computer as a first hyperlink among the loaded web page content; and means for executing said second command in response to activation of the first hyperlink by the end user, whereupon said second prescribed resource address is accessed, a second executable resource located at the second prescribed resource address being executed in response to the access of the second prescribed resource address to determine a function of the first hyperlink, wherein the determined function is based upon the end user status and the first web page resource status;

wherein the end user status is any status among a range of end user statuses comprising a first end user status identifying the end user as being a participating end user and a second end user status identifying the end user as being a non-participating end user;

wherein the first web page resource status identifies the first web page resource as being one of a referral web site start page, a referral web site non-start page, a privileged web site start page, a privileged web site non-start page, and a non-referral web site, non-privileged web site, participating web page, wherein for a given end user there is only one referral web site start page and at least one referral web site non-start page, and wherein said one referral web site start page and at least one referral web site non-start page are part of a common domain, and wherein there are a plurality of non-referral web site participating web pages;

wherein said one privileged web site start page and at least one privileged web site non-start page are part of a common domain, wherein there are a plurality of non-referral web site, non-privileged web site, participating web pages, wherein when the end user status is the first status and the first web page resource status identifies the first web page resource as the privileged web site start page, the function of the first hyperlink is to link the end user computer to an end-user preferred web page resource;

wherein when the end user status is the second end user status, the function of the first hyperlink is to link the end user computer to a prescribed web page resource, and further comprising:

means for loading and displaying web page content from the prescribed web page resource;

means for sending agreement from the end user to become a participating end user; and means for receiving data at the end user computer which identifies the first web page resource to have be the referral web site start page.

15. A system for linking an end user computer to access web page resources on a global computer network, the system comprising:

means for loading and displaying at an end user computer, web page content from a first web page resource, the first web page resource being one of a plurality of participating web page resources, each one of the plurality of participating web page resources including a common prescribed hyperlink protocol among a set of hypertext markup language commands, the common prescribed hyperlink protocol including a first command to access a first prescribed resource address on the global computer network and a second command to access a second prescribed resource address on the global computer network;

means for executing said first command during said loading, whereupon said first prescribed resource address is accessed, a first executable resource being executed in response to said access of said first prescribed resource address, the first executable resource during execution identifying a status of the end user and a status of the first web page resource and returning to the end user computer a label selected based upon the identified end user status and the identified first web page resource status, said label being displayed at the end user computer as a first hyperlink among the loaded web page content; and means for executing said second command in response to activation of the first hyperlink by the end user, whereupon said second prescribed resource address is accessed, a second executable resource located at the second prescribed resource address being executed in response to the access of the second prescribed resource address to determine a function of the first hyperlink, wherein the determined function is based upon the end user status and the first web page resource status;

wherein the end user status is any status among a range of end user statuses comprising a first end user status identifying the end user as being a participating end user and a second end user status identifying the end user as being a non-participating end user;

wherein the first web page resource status identifies the first web page resource as being one of a referral web site start page, a referral web site non-start page, a privileged web site start page, a privileged web site non-start page, and a non-referral web site, non-privileged web site, participating web page, wherein for a given end user there is only one referral web site start page and at least one referral web site non-start page, and wherein said one referral web site start page and at least one referral web site non-start page are part of a common domain, and wherein there are a plurality of non-referral web site participating web pages;

wherein said one privileged web site start page and at least one privileged web site non-start page are part of a common domain, wherein there are a plurality of non-referral web site, non-privileged web site, participating web pages, wherein when the end user status is the first status and the first web page resource status identifies the first web page resource as the privileged web site start page, the function of the first hyperlink is to link the end user computer to the referral web site start page for the end user;

wherein when the end user status is the second end user status, the function of the first hyperlink is to link the end user computer to a prescribed web page resource, and further comprising:
   means for loading and displaying web page content from the prescribed web page resource;
   means for sending agreement from the end user to become a participating end user; and
   means for receiving data at the end user computer which identifies the first web page resource to have be the referral web site start page.

16. A system for linking an end user computer to access web page resources on a global computer network, the system comprising:
   means for loading and displaying at an end user computer, web page content from a first web page resource, the first web page resource being one of a plurality of participating web page resources, each one of the plurality of participating web page resources including a common prescribed hyperlink protocol among a set of hypertext markup language commands, the common prescribed hyperlink protocol including a first command to access a first prescribed resource address on the global computer network and a second command to access a second prescribed resource address on the global computer network;

means for executing said first command during said loading, whereupon said first prescribed resource address is accessed, a first executable resource being executed in response to said access of said first prescribed resource address, the first executable resource during execution identifying a status of the end user and a status of the first web page resource and returning to the end user computer a label selected based upon the identified end user status and the identified first web page resource status, said label being displayed at the end user computer as a first hyperlink among the loaded web page content; and means for executing said second command in response to activation of the first hyperlink by the end user, whereupon said second prescribed resource address is accessed, a second executable resource located at the second prescribed resource address being executed in response to the access of the second prescribed resource address to determine a function of the first hyperlink, wherein the determined function is based upon the end user status and the first web page resource status;

wherein the end user status is any status among a range of end user statuses comprising a first end user status identifying the end user as being a participating end user and a second end user status identifying the end user as being a non-participating end user;

wherein the first web page resource status identifies the first web page resource as being one of a referral web site start page, a referral web site non-start page, a privileged web site start page, a privileged web site non-start page, and a non-referral web site, non-privileged web site, participating web page, wherein for a given end user there is only one referral web site start page and at least one referral web site non-start page, and wherein said one referral web site start page and at least one referral web site non-start page are part of a common domain, and wherein there are a plurality of non-referral web site participating web pages;

wherein said one privileged web site start page and at least one privileged web site non-start page are part of a common domain, wherein there are a plurality of non-referral web site, non-privileged web site, participating web pages, wherein when the end user status is the first status and the first web page resource status identifies the first web page resource as one of the privileged web site non-start pages, the function of the first hyperlink is to change the privileged web site start page to the first web page resource;

wherein when the end user status is the second end user status, the function of the first hyperlink is to link the end user computer to a prescribed web page resource, and further comprising:
   means for loading and displaying web page content from the prescribed web page resource;
   means for sending agreement from the end user to become a participating end user; and
   means for receiving data at the end user computer which identifies the first web page resource to have be the referral web site start page.

* * * * *